Sept. 20, 1932.  E. C. SAVAGE  1,877,979
CONTAINER
Filed Jan. 25, 1932
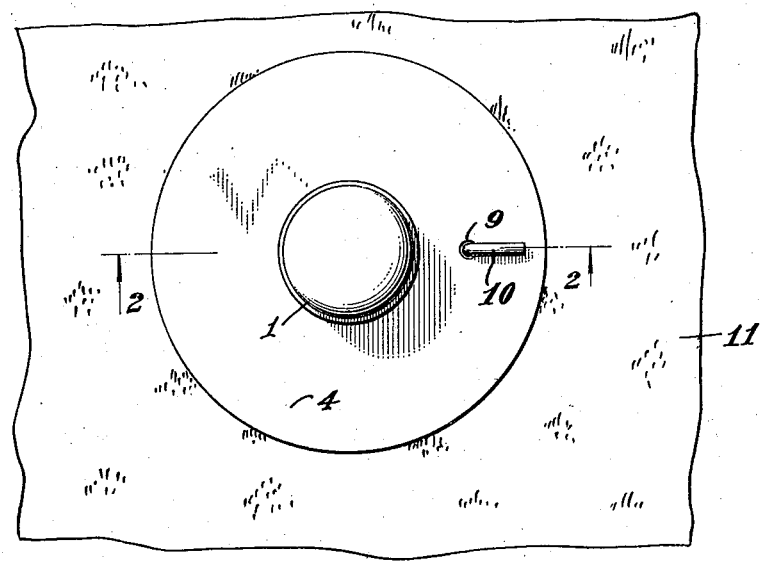
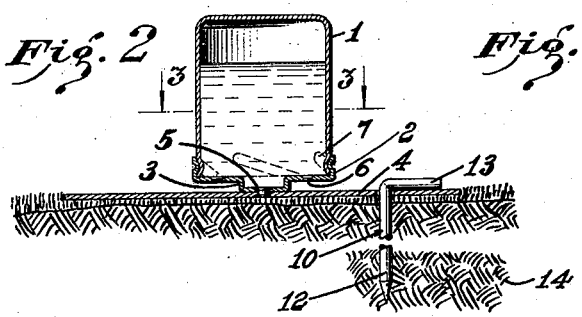
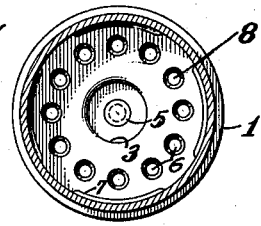
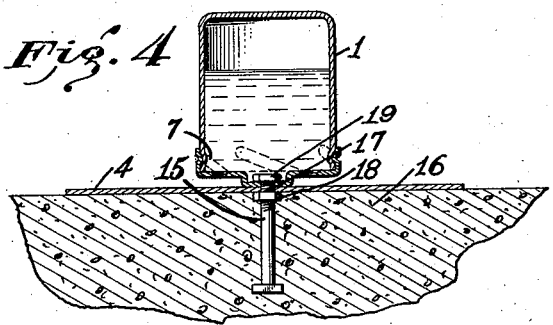
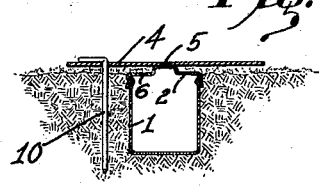
INVENTOR,
Egbert C. Savage;
BY
ATTORNEY Patented Sept. 20, 1932

1,877,979

UNITED STATES PATENT OFFICE

EGBERT C. SAVAGE, OF SANTA MONICA, CALIFORNIA

CONTAINER

Application filed January 25, 1932. Serial No. 588,554.

This invention relates broadly to containers and more particularly to a type of container adapted to house a substance such as a poison, in such a manner that the contents may be eaten by insects, such as ants.

An object of the invention is the provision of a container adapted to constantly feed any material therein in such a manner that the contents may be readily contacted.

Another object is the provision of a container adapted to house various materials in a manner in which the materials cannot be contaminated under ordinary use and service.

With respect to the foregoing object, certain insects are capable of souring any poison syrup if they succeed in getting into said syrup. The present invention is so constructed that it is quite impossible for the insect to be immersed within the syrup, which would only cause the insect's death and the souring of the syrup. Thus, with my invention, I so construct the container that the syrup or other material is constantly fed to a given zone and the syrup or other material contacted at said zone, the general body of the syrup being uncontaminated or touched.

Another object is the provision of a device of the character stated adapted to house insect destroying material, such as a poison syrup, in such a manner that the insect is capable of crawling away after feeding upon the contents.

With reference to the foregoing object, certain containers adapted to house poison syrup are so constructed that ants may contact with said syrup and if the ants eat or gorge themselves too greatly, the ants are unable to leave the container, with the result that they drop back within the syrup. With my invention, it is impossible for the ants to so engorge themselves as to prevent their leaving the container.

Another object is the provision of a container adapted to house a poison material, such as a poison syrup, in such a manner that the syrup is prevented from evaporating. It has been found by actual experience that ants require or like best a thin syrup. A thick syrup is not always eaten and the present invention always maintains the syrup in an edible condition.

Another object of the invention is the provision of a container which may be set in the ground and in which water or other substance is prevented from contaminating or diluting the contents of the container.

Another object is the provision of a container adapted to house poison material, which container may be easily serviced.

Another object is the provision of a device of the character stated, which is adapted to hold any form of bait, whether solid or liquid or a repellant.

The invention has for further objects the provision of a device of the character stated which is simple of construction, inexpensive in cost of manufacture, and generally superior to devices adapted to accomplish a like object, to-wit, the extermination of insects.

With the above and other objects in view, the invention consists in the novel and useful provision, formation, construction, association, and relative arrangement of parts, members and features, all as shown in certain embodiments in the accompanying drawing, described generally, and more particularly pointed out in the claims.

In the drawing:

Figure 1 is a plan view showing the invention in position of service,

Figure 2 is a sectional view on the line 2—2 of Figure 1,

Figure 3 is a sectional view on the line 3—3 of Figure 2,

Figure 4 shows a slight modification of the invention, and,

Figure 5 shows the device inverted from the position of Figure 2.

Referring now with particularity to the drawing, the improved invention includes a container 1 provided with a cap 2. In the present instance, the container is adapted to be inverted as best illustrated in the drawing. The said cap 2 is centrally depressed, as shown at 3, with the said depressed portion secured to a disc 4 by a rivet or other securing means 5. The said depressed portion is adapted to maintain a surface portion 6 of the said cap spaced from the surface of the disc 4. I may provide threads 7 between the container and the said cap for quick detachable engagement between the cap and the said container. The said cap is provided with one or more perforations 8 arranged in annular formation or any formation desired. The disc 4 may be of any size, in accordance with use and service, and said disc may be provided with a perforation 9 whereby suitable securing means 10 may hold the disc to some supporting object, such as shown at 11. In the present instance, the means 10 includes an elongated pin 12 provided with a bent-end extremity 13. The bent end extremity engages the top surface of the disc while the elongated portion will be received within the supporting object which, in the present instance, may constitute earthy formation, as shown at 14. In the present instance, the said disc 4 has a diameter greater than the diameter of the cover of the container, although size of the said disc will depend upon use and service. The principal object of the disc is to provide a support for the cap of the container and likewise provide a medium by which the container may be secured to earthy formation or the like by the means 10.

The cap may be formed in various manners, that shown in the drawing being illustrative only.

In Figure 4, I have illustrated a slight modification of the invention wherein a securing means 15 is adapted to have the shank portion thereof embedded within suitable material which, in the present instance, constitutes concrete 16. The securing means 15 is threaded at 17, and through the medium of a nut 18 causes the disc 4 to engage the depressed portion of the cap and a further nut 19 is screw-threaded to the threads on the shank which will secure the cover to the disc. The container is the same as before and the quick detachable type of threads 7 may be resorted to.

The operation, uses and advantages of the invention just described are as follows:

When it is desired to replenish the container with a syrup containing poison or other ingredient for the purpose of exterminating insects, the operator will first remove the securing means 10 so that the device as an entirety may be removed from its supporting object. The container is then filled and held in an upright position so as not to spill the contents and the cap thereafter secured thereto through the medium of the quick detachable threads. The container cap and disc are then inverted and may again be secured to the supporting medium through the device 10 or, in the case of the form of the invention illustrated in Figure 4, the cap may be secured by the nut 19 to the screw-threads of the member 15.

It will be seen from the drawing that the surface of the cap is spaced from the top surface of the disc and it will be further observed from Figure 3 that the perforations have a given diameter. The air pressure exerted against any syrup within the container will be in accordance with the exposed area of the perforations and this air pressure is sufficient to keep the syrup from escaping through said perforations. Insects such as ants may bridge between the disc 4 and the cover 2 and feed upon said syrup through the perforations 8. The ants or other insects will feed in the zone of the perforations, the syrup or other material being constantly fed thereinto. If the insect attempts to crawl through the perforations, it is intended that the perforations should be of sufficient diameter to allow the insect to withdraw its body so that the insect will not die within the syrup. Certain insects, bugs, and the like, tend to contaminate syrup and ants, it has been found by experiment, will not feed upon any syrup that has been soured. Furthermore, ants like thin syrup and the present invention is admirably adapted to house thin syrup within the container thereof. It is apparent that a vacuum is created within the container when the container is inverted and secured to its cap. This vacuum, plus the air pressure against the surface of the cap, will keep even liquids as thin as water from escaping through the perforations and still constantly feed the liquid into said perforations. It is also evident that the construction of the invention prevents evaporation of the liquid contents therein.

The invention may be made in any size desired and is particularly adaptable for use out of doors in orange orchards, around the home, and the like. Obviously, the ground surrounding the device may be flooded with water and still water kept from contacting or diluting the syrup due to pressure difference. Consequently when the water recedes, it is found that the syrup is not harmed in the least.

The position of the cover with its perforations permits an ant to feed upon the syrup and crawl away without the ant dropping back into the syrup after feeding. This is a point of distinct advantage because in certain devices known to the inventor, the ant may engorge itself with sufficient of the syrup so that the ant cannot leave the container, with the result that it may drop back into the syrup and contaminate the same. In certain adaptations of the invention, it may be desired to maintain the container in an upright position, in which instance the disc 4 would be inverted from the position shown in Figures 2 and 4, (see Figure 5). When this occurs, it will be apparent that the disc will act as a shade for the container. Certain insects require shade or comparative darkness and the disc will function in this manner. The insect will crawl between the disc and the top of the cover through the perforations therein and eat or otherwise contact with the syrup within the container.

The container, as before stated, may house material other than syrup, such as solids or liquids, the solids being adapted to give forth a gas or repellants of any chemical constituent may be placed within the container.

It is intended that this invention should be serviced at given times and it is likewise apparent that said servicing is easily accomplished. It is only necessary to remove the securing means from the disc to contact with the remaining portions of the invention. In the form shown in Figure 4, the container plus its cover may be removed and after a filling of the container the cover may be again secured to the means 15.

I do not intend to restrict myself to any given size of device as it will vary in accordance with use and service. The disc 4 acts as a medium for preventing tipping over of the container and likewise as a medium for supporting the container.

The securing means 10 may be used or not, in accordance with the character of the supporting means. For instance, in the case of a concrete or cement walk, the disc 4 will act as a medium for preventing tipping of the container.

The type of fastening shown in Figure 4 is particularly adaptable for use on public grounds, such as parks, schools, and the like; also around public buildings, as it provides a positive means for holding the container in place. It is intended that the nut 19 be welded or otherwise secured to the cover so that said cover may be readily removed from the securing means 15.

I may resort to other constructions, such as by securing the nut 18 to the disc 4 and the disc 4 and nut 19 in turn both secured to the cover, so that rotation of the cover will cause both nuts to move upon the screw-threads of the securing means 15. In this manner, the disc 4 is caused to have a flush engagement with the ground or cement surface.

The securing means of either form, to-wit, that shown in Figures 2 and 4, provides a fastening adapted to hold a container firmly so that small children, pets and the like cannot get at the poison syrup. This is an important feature.

Within the purview of my invention, the cover of the container may be held riveted to the disc, as shown at 5, in such a manner as to prevent rotation between the cover and the disc. Also I may use any form of securing means between the said container and the cover, such as the well known bayonet slot, or I may have a pressed fit engagement between the two elements.

It is obvious that various changes and modifications and variations may be made in practicing the invention in departure from the particular showing of the drawing without departing from the true spirit of the invention.

I claim:
1. In a device of the character disclosed, a container, a cover formed with a perforation for said container, and a disc secured to said cover and spaced therefrom at the zone of said perforation.

2. In a device of the character disclosed, a container, a cover formed with a perforation for the container, a disc, and means between said disc and cover for spacedly maintaining a portion of said cover from said disc.

3. In a device of the character disclosed, a container, a cover formed with a perforation for detachable engagement therewith, a disc, and means centrally disposed relative to the cover and secured to said disc for spacedly maintaining the cover from said disc.

4. In a device of the character disclosed, a container, a cover for detachable engagement with said container, and a disc, said cover being provided with a centrally depressed portion secured to said disc and for spacing a portion of the cover from said disc, outwardly from said depressed portion; and said cover being provided with a perforation in the zone of spacing between the cover and said disc.

5. In a device of the character disclosed, a container, a cover for detachable engagement with said container, and a disc, said cover being provided with a centrally depressed portion secured to said disc and for spacing a portion of the cover from said disc, outwardly from said depressed portion; and said cover being provided with a perforation in the zone of spacing between the cover and said disc, in combination with means for securing said disc to a supporting object.

In testimony whereof, I have signed my name to this specification at Los Angeles, California, this 11th day of January, 1932.

EGBERT C. SAVAGE.